Dec. 5, 1950 E. K. STODOLA 2,532,347
RADAR RECEIVER AUTOMATIC GAIN CONTROL CIRCUIT
Filed July 26, 1944
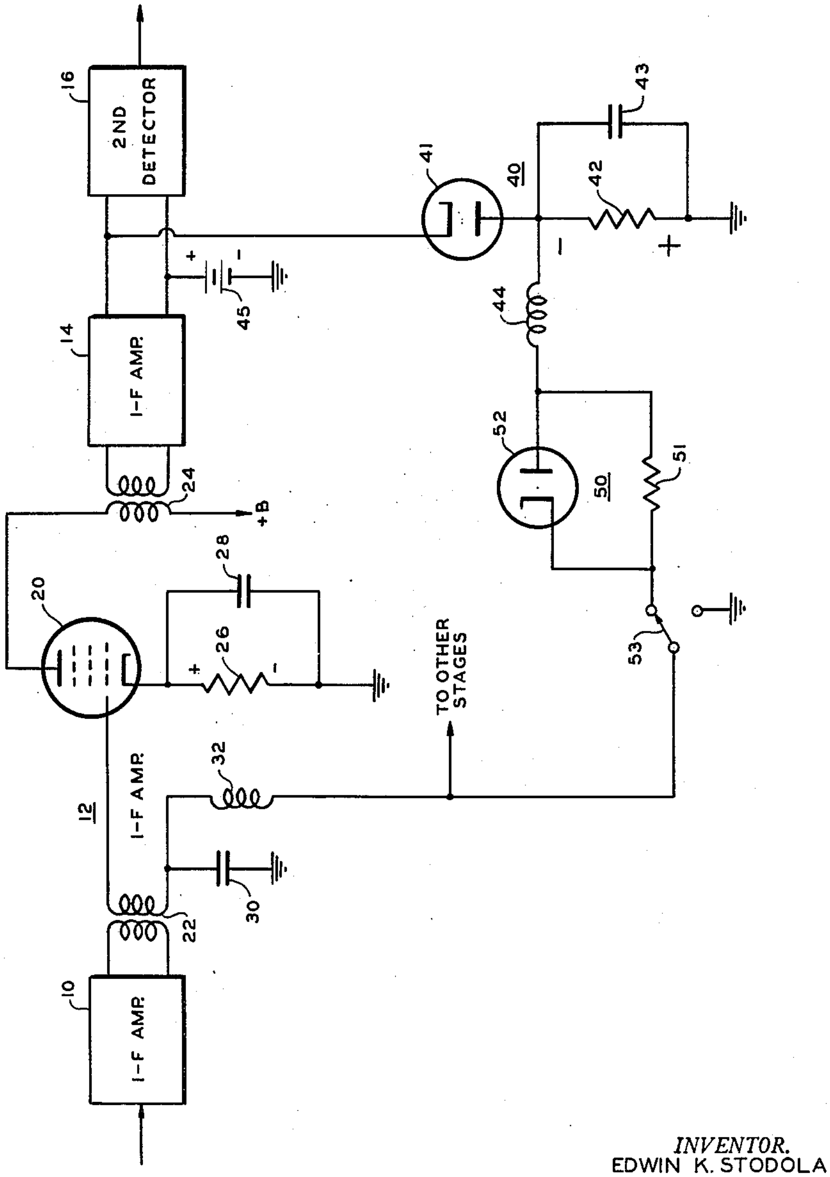
INVENTOR.
EDWIN K. STODOLA
BY William D. Hall
ATTORNEY Patented Dec. 5, 1950 2,532,347

UNITED STATES PATENT OFFICE 2,532,347

RADAR RECEIVER AUTOMATIC GAIN CONTROL CIRCUIT

Edwin K. Stodola, Neptune, N. J., assignor to the United States of America as represented by the Secretary of War Application July 26, 1944, Serial No. 546,726

3 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates, in general, to means for reducing the effects of interference in pulse receivers. In particular, it relates to means for reducing the possibility of overloading or saturation of the sensitive receiver of a radio pulse-echo object location system by strong interfering signals which are of longer duration or modulated at a lower rate than the desired signals.

In conventional object-location systems, sharp pulses of wave energy, i. e., wave trains of relatively short duration, are intermittently transmitted at intervals considerably longer than said duration. When said waves strike a reflecting object, echoes are received; and the time between the transmission of a pulse and the reception of its echo is measured to determine the range of the reflecting object. The minimum length of the intervals between pulses depend upon the maximum distance to be measured and the speed of wave propagation; for radio waves, approximately ten microseconds per mile.

Since only a minute portion of the energy is reflected, it is necessary to use very sensitive receivers, which must have wide-band signal channels to adequately resolve the sharp pulses handled thereby. Consequently, such receivers are extremely susceptible to interferring signals on the same or adjacent channels, which tend to overload or saturate the receiver, particularly the later stages thereof, so that it is rendered incapable of detecting desired echo pulses.

To reduce the tendency of strong signals which are modulated at a lower rate than the desired signals to saturate the receiver, it has been the prior practise to use a portion of the detected output of the receiver as a fast-acting gain-control bias on the tube of a preceding stage. To prevent blocking or degeneration of desired pulse signals, the biasing voltage is applied after an initial delay which is preferably longer than the duration of the desired pulses. If said interfering signals are of longer duration or modulated at a lower rate than the desired signals, said negative bias will remain and cause the tube to operate at a lower point of its plate current/grid potential curve, so that the gain is reduced. Said bias can be made so high that substantially only the peaks of succeeding desired signals extend to any great extent, into the conducting region of the tube. In order that the bias be removed substantially immediately after the interfering signal has ceased, said bias is applied through a circuit in which energy builds up slowly and decays rapidly.

It is an object of the present invention to provide a fast-acting biasing network of the type above discussed, which is responsive only to signals above a predetermined amplitude.

It is a further object of this invention to provide a signal-responsive, fast-acting biasing network of the type above discussed, which is simple in design and easily incorporated in existing pulse modulation receivers without extensive changes therein. For this purpose an auxiliary detector is connected to the output of one of the I.-F. stages. The output of said detector is applied as a gain-control bias to one of the preceding stages of the receiver. To provide a decay of the bias voltage which is faster than the build-up time, the output of said detector is applied as a charge on a capacitor in the grid-cathode circuit of the tube in said preceding stage, through a circuit having a predetermined time constant. When the detected output disappears, the charge on said capacitor is dissipated through a circuit having a considerably smaller time constant than said charging circuit. The time constant of the charging circuit is preferably less than the interval between the desired pulse signals, and usually not larger than about four to ten times the duration of each pulse.

For a better understanding of the invention, together with other and further objects thereof, reference is had to the following description taken in connection with the accompanying drawing, and its scope will be pointed out in the accompanying claims.

In the drawing, there is shown a schematic circuit of one embodiment of the invention, as applied to the receiver of a pulse-echo system. The receiver is of the superheterodyne type and comprises a plurality of intermediate-frequency (I.-F.) amplifier stages 10, 12 and 14 in cascade, coupled to the usual antenna and frequency changer circuits (not shown). The last I.-F. stage is coupled to the usual second detector to derive the pulse modulation envelopes of the received echoes, which may in turn be further amplified by a video amplifier and impressed upon a range-indicating oscilloscope in a manner well known in the art.

Each I.-F. amplifier stage comprises an electron tube 20, which is preferably a pentode such as type 6AC7, and the usual interstage couplings, in this case transformers 22 and 24. Steady grid-bias potential is provided by a cathode resistor 26 shunted by a capacitor 28. The output of transformer 22 is impressed between the input grid and cathode of tube 20 through capacitors 28 and 30, which are both of low impedance to the I.-F. currents. A choke 32, of high impedance to I.-F. currents, is used to keep the I.-F. energy out of the biasing circuits, hereinafter described in greater detail.

In accordance with the present invention, the output of one of the I.-F. amplifier stages, in this case the last stage 14, is detected by an auxiliary detector circuit 40 to derive the modulation envelope of the received signals (although the output of detector 16 can be used for this purpose) and said modulation envelope is impressed as an additional negative bias between the grid and cathode of the preceding stage 12. Said bias is applied through an asymmetrically conducting circuit 50, which provides a slight delay in the building up of the bias voltage, but causes a rapid decay of said bias upon the cessation of the signal.

Detector 40 comprises a diode 41 in series with an output circuit including a load resistor 42, shunted by a capacitor 43 of low impedance to the I.-F. energy, but of high impedance to the derived modulation envelope components. The output across resistor 42 charges condenser 30 through a circuit including an I.-F. choke 44, a high-resistance resistor 51, shunted by a diode 52, a switch 53, and choke 32.

The above-described circuits operate as follows: With switch 53 in the lower position, the cathode circuit of tube 20 is connected to ground, and the negative bias developed across resistor 26 is impressed upon the grid of said tube through ground, choke 32, and the secondary of transformer 22. In accordance with this mode of operation, circuits 40 and 50 are disconnected and the amplifier operates in the conventional manner, which may be preferred when interference is not extensive.

In the presence of continuous waves or other interference which is of longer duration or modulated at lower rates than the desired signals, switch 53 is moved to the upper position as shown. As a result, detected signals appearing across load resistor 42 are impressed as a charge upon capacitor 30, through the relatively large resistor 51, since diode 52 is so connected that it is non-conducting to currents in the charging direction. The potential across capacitor 30 is in series with the negative grid bias developed across resistor 26, and is of such polarity as to render the grid more negative.

The time constant of the circuit including resistor 51 and capacitor 30 is made a minor fraction of the intervals between the desired pulse signals. Preferably, said time constant is not more than five to ten times the duration of the desired signal pulse so that the latter will be transmitted by the amplifier tube before the additional bias due to said desired pulse rises to any appreciable extent. On the other hand, interfering signals of longer duration than said desired pulses will (after initial delay due to the charging time) develop a more or less steady increase in the negative bias and shift the operating point of the tube to a lower point on the plate-current/grid-voltage characteristic. The resultant reduction in gain degenerates most of the interfering signals, and reduces the tendency to overload or saturate the succeeding stages. Desired pulses occurring in the presence of interfering energy will be transmitted by said tube before any additional bias due to said pulses can be built up. Thus, the circuit discriminates in favor of sharply rising pulses of short duration.

To dissipate as quickly as possible the increased bias produced by each signal after the latter has ceased, a relatively low resistance electronic path, in this case a diode 52, is provided, so that the bias voltage across capacitor 30 can discharge through said diode and resistor 42 to ground. Since the resistance of the discharge path through said diode is considerably smaller than the charge path through resistor 51, the bias is dissipated considerably faster than it is built up.

As an example of a suitable design for a pulse-echo system in which pulses of about 20 microseconds are transmitted at intervals of about 1600 microseconds, the following component values were found suitable: resistors 42 and 51 were 10,000 ohms and one megohm, respectively; capacitors 30 and 43 were 100 micromicrofarads and 25 micromicrofarads, respectively; and tubes 41 and 52 were type 9002 (VT2) triodes with the grids and plates connected together so that they functioned as diodes. The time constant of the charging circuit of condenser 30 is therefore about 100 microseconds, which amounts to about five times the pulse duration and 1/160 of the interval between pulses. The time constant of the condenser discharge circuit, through diode 52 and resistor 42, is about one percent of that of the charging circuit. It is to be distinctly understood, however, that other circuit constants may be used, since, as above explained, they depend upon factors such as pulse duration, the interval between pulses, and the nature of interfering signals encountered.

Another feature of this invention is the use of a source of potential 45, to provide diode 41 with a suitable delay bias, so that it will not start conducting until signals above a predetermined amplitude are applied thereto. Thus the automatic bias potentials will be developed only when signals above said amplitude are encountered. Said gain-control potentials can also be applied in proper proportions to several stages in the receiver, both before and after the stage which feeds bias-producing detector 40.

From the foregoing description, it will be seen that the automatic biasing circuit of the present invention can be easily applied to an existing receiver without extensive modification thereof. Only a single connection is extended to the output of one of the receiver stages, and another connection to the input circuit of one of said stages, although the value of normal biasing components of said input circuit may need to be changed slightly in some cases.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. In a radio pulse-echo object detection system wherein pulses of carrier-wave energy are intermittently transmitted and echoes thereof received, a carrier-wave channel having a number of cascaded stages each including a grid-controlled electron tube, a pair of detectors energized in parallel by the output of said channel, for deriving modulation envelopes of said output, one of said detectors being adapted to be coupled to signal translating and indicating means, means responsive to the output of the other detector to decrease the amplification of a prior stage of the receiver, said other detector having a load circuit, said last-named means comprising a capacitor connected between the cathode and grid of the electron tube in said stage, a circuit including a resistor and said capacitor connected in series across said load circuit, a diode so connected across said resistor that it is nonconducting for currents in the charging direction and conducting for currents in the discharging direction, whereby the discharging time of said capacitor is less than the charging time thereof, said resistor and capacitor having a time constant equal to a minor fraction of the interval between successive pulses transmitted by said system.

2. In a pulse-echo object detection system wherein pulses of radio carrier wave energy are intermittently transmitted and echoes thereof received, the duration of said pulses being a minor fraction of the intervals therebetween, a carrier-wave channel having a number of cascaded stages each including a grid-controlled electron tube, a detector energized by the output of said channel and having a load circuit for deriving the modulation envelope of said output, means responsive to the output of said detector to control the amplification of a prior stage of the receiver, said last-named means comprising a capacitor connected between the cathode and grid of the electron tube in said stage, a charging circuit between said load circuit and said capacitor, comprising a resistive path of such resistance that the time constant of said charging circuit is a minor fraction of the interval between pulses, but not more than ten times the pulse duration, and a discharging circuit for said capacitor comprising an electron discharge tube having at least a pair of electrodes so connected to said resistive path that the time constant of said discharging circuit is a minor fraction of that of said charging circuit.

3. The apparatus defined in claim 2 including means for impressing a potential on said detector for biasing said detector beyond its current cut off point and thereby rendering it unresponsive to outputs from said carrier-wave channel having less than a predetermined magnitude.

EDWIN K. STODOLA.

REFERENCES CITED

The following references are of record in the file of this patent:

UNITED STATES PATENTS

| Number | Name | Date |
|---|---|---|
| 2,093,095 | Peterson | Sept. 14, 1937 |
| 2,111,386 | Buchmann et al. | Mar. 15, 1938 |
| 2,137,401 | Hobbie | Nov. 22, 1938 |
| 2,171,657 | Klotz | Sept. 5, 1939 |
| 2,189,925 | Reinken | Feb. 13, 1940 |
| 2,200,049 | Van Loon | May 7, 1940 |
| 2,207,094 | Getaz | July 9, 1940 |
| 2,216,582 | Barton | Oct. 1, 1940 |
| 2,262,841 | Goddard | Nov. 18, 1941 |
| 2,329,570 | Wellenstein | Sept. 14, 1943 |
| 2,344,697 | Hollingsworth | Mar. 21, 1944 |
| 2,354,086 | MacKay | July 18, 1944 |
| 2,427,691 | Pritchard | Sept. 23, 1947 |